United States Patent Office — 2,863,843 — Patented Dec. 9, 1958

2,863,843

FILM FORMING AQUEOUS COLLOIDAL DISPERSIONS CONTAINING NITROGENOUS CONDENSATION PRODUCTS AND PROCESS FOR PREPARING SAME

Charles R. Scott and Paul A. Wolf, Midland, Mich., assignors to The Dow Chemical Company, Midland, Mich., a corporation of Delaware No Drawing. Application October 27, 1955
Serial No. 543,253

10 Claims. (Cl. 260—29.6)

This invention relates to improved aqueous colloidal dispersions. It is particularly concerned with compositions comprising synthetic latexes and a method for making such compositions.

Synthetic latexes have found widespread application in the protective coating field. In such usage, the latex or a composition containing it is applied to masonry, metal or wood surfaces whereby films are formed which tend to adhere to the solid surface and protect the latter against marring and weathering. The latexes commonly are modified by the addition of pigments and other agents to provide latex paint compositions which have desirable properties as regards ease of application, ease of clean-up, self-sealing, alkali resistance and odor. The synthetic latexes are also employed as saturants for papers to improve such properties as tear resistance.

Certain problems have been encountered in the storage and application of synthetic latexes and compositions in which they are employed. For example, the synthetic latexes contain stabilizers and emulsifiers to maintain the polymer in the dispersed state. Many commonly employed stabilizers and emulsifiers are organic in nature and subject to attack by microorganisms. When the latexes are employed in latex paint formulations, they are modified with other additaments such as thickeners, pigment dispersants and stabilizers which are also subject to attack by bacteria and fungi. The resultant microbiological activity frequently results in undesirable alterations in the viscosity of the latex system and unfavorable affects its spreading and odor characteristics.

In commercial latex paint formulation, various preservatives have been employed to prevent attack by microorganisms. To accomplish such control with phenols and their salts it has been found necessary to maintain the latex compositions at a pH of 9 or higher. However, to minimize viscosity changes caused by hydrolytic breakdown of common protein components, prevent detinning of containers and permit general flexibility in manufacture and use, it is desirable that latex compositions be maintained at lower pH levels. Thus, the phenols and phenolates do not represent the ultimate as preservatives. Organic mercury compounds, on the other hand, are not only hazardous but unfavorably affect color stability in certain formulations.

Furthermore, it has been found that films cast from conventional latexes and latex paints are subject to decomposition, discoloration and breakdown upon exposure to light. There is also a tendency for such films to blister, crack and peel upon exposure to extreme and changing conditions of light, temperature and moisture. In addition, the problems of water sensitivity, spotting and rust staining of films of known latexes and water-emulsion paints in which they are employed, are limiting factors in the use of such compositions. The desirability of the provision of improved synthetic latex and latex containing compositions and of methods for avoiding the problems inherent in the applications of such compositions, is evident.

It is an object of the present invention to provide for improved compositions of aqueous colloidal dispersions comprising synthetic latexes. A further object is to provide synthetic latexes characterized by properties of resistance to microbial attack and degradation. A further object is to provide a method for imparting improved properties of stability to latexes and aqueous colloidal dispersions in which they are employed. Other objects will become apparent from the following specification and claims.

According to the present invention it has been discovered that improved aqueous colloidal dispersions comprising synthetic latexes are obtained when there is incorporated into the synthetic latex a minor proportion of a water soluble polyamine condensation product of from 1.5 to 3.5 molecular proportions of formaldehyde with one molecular proportion of an aliphatic polyamine having the general formula

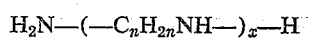

$$H_2N-(-C_nH_{2n}NH-)_x-H$$

wherein $n$ is an integer of from 2 to 3, inclusive, and $x$ is an integer of from 1 to 4, inclusive. The addition of such a polyamine condensation product imparts a beneficial stabilizing effect to the resultant colloidal dispersions and to films formed therefrom when said dispersions are cast on solid surfaces and allowed to dry. The improved dispersions are resistant to attack by microorganisms in the neutral and alkaline pH range. The free films and/or coatings formed from certain of such compositions exhibit stability to degradation such as discoloration, surface breakdown, peeling and rust staining normally caused by exposure to heat, light and/or water.

The expression "synthetic latex" as herein employed is intended to mean any aqueous colloidal dispersion of polymers of polymerizable olefinically unsaturated monomers exclusive of vinyl and vinylidene halide monomers. Examples of such polymeric materials are copolymers of monoethylenically unsaturated compounds such as styrene and acrylonitrile with a conjugated diolefin such as butadiene; homopolymers and copolymers of styrene, acrylic and methacrylic esters; and homopolymers and copolymers of vinyl acetate. The synthetic latexes are aqueous dispersions usually containing in addition to the polymer, an emulsifying agent, polymerization catalysts and buffers. They may, in addition, contain other non-polymeric additives such as a plasticizer or stabilizer. Typical of the synthetic latexes with which this invention is concerned are those described in U. S. Patent No. 2,498,712. Emulsifying agents, which may be employed include sodium oleate, sodium sulfate esters of higher alcohols, or sodium sulfonates of alkylated naphthalenes. Representative catalysts are potassium persulfate or benzoyl peroxide. Buffers which are oftentimes used include sodium bicarbonate and sodium tetraborate.

The term "latex paint" as herein employed refers to an aqueous colloidal dispersion containing a synthetic latex composition as above defined to which has been added a pigment. The term "pigment" denotes colored as well as white pigments and is understood to be inclusive of mineral products used as fillers and extenders. In addition, pigment dispersants, thickeners and other paint making ingredients may be present in latex paint. These ingredients and latex paint compositions containing them are extensively described in the art, e. g. in U. S. Patent No. 2,498,712. Representative pigment dispersants are tetrasodium pyrophosphate and lecithin. Colloid stabilizers and thickeners which may be used include casein α-protein, and water soluble cellulose derivatives.

The preferred polymeric materials to be contained in the synthetic latexes in accordance with the present invention are copolymers prepared from 25–75 percent of at least one conjugated aliphatic diolefin such as butadiene or isoprene and 75–25 percent of at least one vinyl aromatic compound such as styrene or vinyl toluene.

The polyamine condensation products with which the present invention is concerned may be employed in any operable proportion. While good results have been obtained with from 0.25 to 5 percent by weight of the polyamine condensation product when based on the weight of solids present in the synthetic latex, the range of from 0.75 to 3 percent by weight is preferred. In preparing the improved aqueous colloidal dispersion, the water-soluble polyamine condensation product is blended with the synthetic latex by mechanical mixing. The polyamine condensation product is usually first dissolved in water, ethanol, 50:50 methanol-water or other suitable solvent and thereafter introduced into the latex with agitation. Good results have been obtained by employing methanol-water solutions containing 35 to 50 percent of the polyamine condensation product.

When the aqueous colloidal dispersion is a latex paint, desirable results have been obtained when the polyamine condensation product is employed in an amount of from about 0.06 to 3 percent by weight. This percentage by weight is calculated on the basis of the dry weight of the polyamine condensation product and the total weight of the paint employed. The preferred range is considered to be 0.3 to 1.0 percent by weight. The incorporation of the polyamine condensation product into the paint may be made at any point in its manufacture. It may be introduced before or after the addition of the pigment dispersion to the latex or added to said dispersion. Conveniently, a solution of the polyamine condensation product may be blended into the formulated latex paint.

A number of desirable properties characterize the aqueous colloidal dispersions provided by this invention. For example, all of the latex and latex paint compositions of the present invention are found to be resistant to microbial deterioration. This protective action is observed throughout the neutral and alkaline pH range. In addition, the films formed when certain synthetic latexes and paints containing them are cast on a solid surface have been found to exhibit stability against diverse degradative effects normally observed on exposure of such films to light and water. The magnitude of the increased stability to light, is as much as fivefold that obtainable with some commercial light stabilizers. This light stabilizing property is particularly advantageous in GRS type latexes where mechanically stable compositions have heretofore not been obtainable with conventional light stabilizers.

Representative synthetic latexes may be prepared by polymerizing mixtures of suitable monomeric compounds in aqueous emulsion in accordance with known procedures. As described in U. S. Patent No. 2,498,712, the polymerizable compounds, in proportions corresponding to the desired composition of the polymeric product, may be mixed with an aqueous solution of an emulsifying agent and the mixture agitated to effect emulsification. The emulsifying agent is ordinarily employed in amount corresponding to from 0.5 to 5 percent of the weight of the polymerizable organic compounds, but it may be used in smaller or larger proportions. A catalyst such as a peroxide is usually added in amount corresponding to from 0.5 to 4 percent of the weight of the compounds to be polymerized, but is not always required. A buffer may be added if desired. The emulsion is heated in a closed container, generally at temperatures between 50° and 100° C., to effect polymerization. After completion of the polymerization, the property of the resulting polymeric dispersion may be modified, if desired, by the incorporation in the dispersion of other additives such as plasticizers or stabilizers.

An example of synthetic latexes which may be employed is a GRS type latex. A representative latex is an approximately 35 percent aqueous colloidal dispersion containing a copolymer of approximately 45 percent butadiene and 55 percent vinyl toluene prepared by emulsion polymerization. This operation can be carried out by charging a reaction with the following:

| | Parts by weight |
|---|---|
| Butadiene | 45.0 |
| Vinyl toluene | 55.0 |
| Water | 178.0 |
| Emulsifier (Ivory flakes) | 4.28 |
| Modifier (Lorol mercaptan) | 0.45 |
| Catalyst (Potassium persulfate) | 0.197 |

The mixture is agitated to effect emulsification and heated at a temperature of 50° C. for 28.5 hours to cause polymerization.

The resulting synthetic latex may be employed for the preparation of a paint emulsion. A typical paint may be formulated as follows:

| Ingredients: | Lbs./100 gals. |
|---|---|
| Titanium dioxide | 250.0 |
| Calcium carbonate | 50.0 |
| Clay | 50.0 |
| Diatomaceous earth | 25.0 |
| Potassium tripolyphosphate | 1.5 |
| Water | 144.0 |
| Casein 15%, Borax cut[1] | 75.0 |
| Synthetic latex + 4.0 parts/100 parts total solids emulsifier [2] (34.4% solids) | 479.0 |
| Antifoamer[3] | 10.0 |

[1] Casein solution is prepared by dispersing 15 parts casein in 83.2 parts cold water, adding 1.8 parts $Na_2B_4O_7.H_2O$ and raising the temperature slowly to 60° C. and maintaining it at that temperature while agitating for 30 minutes, then cooling.
[2] Igepal CO-630, an alkyl aryl polyethylene glycol ether.
[3] Nopco 1407 (20% solution).

Variations may be made in the above formula as will be apparent to those skilled in the art.

The polyamine condensation product as herein employed may be prepared by mixing an appropriate aliphatic polyamine and formaldehyde, preferably with cooling and agitation. The formaldehyde, conveniently can be employed as a 37 percent aqueous solution and is added portionwise to the amine. The temperature preferably is maintained below 50° C. The resulting polyamine condensation product is a clear, viscous aqueous composition which may be somewhat gelatinous. It is miscible with water. The water may be removed at reduced pressure with little or no heating to obtain the product as an anhydrous solid.

Amines suitable for the production of these polyamine condensation products include 3,3'-iminobispropylamine, diethylenetriamine, propylenediamine, ethylene diamine, triethylenetetramine, and tetraethylenepentamine. Especially satisfactory as components of the improved aqueous colloidal dispersion have been polyamine condensation products obtained by the reaction of formaldehyde with 3,3'-iminobispropylamine, diethylenetriamine and ethylene diamine.

The following examples illustrate the invention but are not to be construed as limiting.

EXAMPLE 1

A water paint was made by intimately blending in a conventional manner a pigment dispersion with a synthetic latex and other paint formulation ingredients as described below:

| Composition: | Parts by weight (lbs./100 gal.) |
|---|---|
| Titanium dioxide | 250.0 |
| Kaolin clay | 50.0 |
| Calcium carbonate | 50.0 |
| Diatomaceous silica | 25.0 |
| Potassium tripolyphosphate | 1.5 |
| Water | 270.0 |
| Antifoamer [1] | 10.0 |
| Casein 15%, K$_2$CO$_3$ cut [2] | 74.0 |
| Synthetic latex [3] | 340.0 |
| Potassium polyacrylate (15% solution) | 10.0 |

[1] Commercially available as Nopco 1407 (20% solution).
[2] Casein solution is prepared by adding 150.0 grams casein to 835.0 grams of water, heating slowly to 60° C., slowly adding 15.0 grams of a 50% potassium carbonate solution and continuing the heating and agitation for ⅓ hour, then cooling.
[3] Copolymer of 67% styrene—33% butadiene, 48% solids.

This water paint composition was modified to give compositions containing polyamine condensation products of various aliphatic polyamines with formaldehyde and having the pH indicated as set forth in the following table:

*Table 1*

| Amine | Moles of HCHO per mole amine | pH of Modified Paint Formulation |
|---|---|---|
| Ethylenediamine | 2.0 | 7.9 |
| Diethylenetriamine | 2.0 | 7.5 |
| Diethylenetriamine | 2.2 | 7.2 |
| 3,3'-Iminobispropylamine | 2.5 | 7.5 |
| Triethylenetetramine | 2.4 | 7.9 |
| Tetraethylenepentamine | 2.0 | 8.2 |
| 1,2-Propanediamine | 2.0 | 7.8 |
| Dipropylenetriamine (2,2'-Iminobispropylamine) | 2.5 | 8.0 |

The polyamine condensation products were added in an amount to give a concentration of 0.5 percent of the total weight of paint. Each modified paint sample as well as an unmodified paint sample was then inoculated with a mixed culture of organisms consisting largely of the Pseudomonas, Aerobacter and Proteus species and previously isolated from spoiled samples of α-protein, latex or latex paint. One hundred gram portions of the various paint compositions were inoculated with 0.5 milliliter portion of a 24 hour nutrient broth culture of the mixed organisms and maintained at 37° C. for 24 hours. Multiple streaks were made from these samples on poured nutrient agar plates and the plates incubated at 37° C. for 3 days. At the end of this period streaks made from the inoculated unmodified paint sample showed heavy growth while streaks made from inoculated paint samples modified by the addition of the aforementioned polyamine condensation products showed no sign of microbial growth.

EXAMPLE 2

Synthetic latexes including commercially available latexes of varying monomer composition were modified by the addition of a polyamine condensation product of one of diethylenetriamine with 2.2 moles of formaldehyde, to give a series of latexes containing 0.6 percent by weight of the polyamine condensation product based on the total weight of latex. The pH of the latex samples were then determined and 100 gram portions of the modified as well as unmodified samples were inoculated with 0.5 milliliter portion of a mixed culture of organisms, streaked and incubated as described in Example 1 and observed for growth at the end of the incubation period.

*Table 2*

| Latex | Percentage Condensation Product | pH | Microbial Growth |
|---|---|---|---|
| GRS [1] | None | 8.6 | Yes. |
| GRS [1] | 0.6 | 9.3 | No. |
| Hycar—1562 [2] | None | 8.3 | Yes. |
| Hycar—1562 [2] | 0.6 | 9.0 | No. |
| Elvacet 81–900 [3] | None | 6.9 | Yes. |
| Elvacet 81–900 [3] | 0.6 | 7.9 | No. |
| Latex A [4] | None | 9.3 | Yes. |
| Latex A [4] | 0.6 | 9.6 | No. |
| Latex B [5] | None | 9.1 | Yes. |
| Latex B [5] | 0.6 | 10.0 | No. |
| Rhoplex AC 33 [6] | None | 9.0 | Yes. |
| Rhoplex AC 33 [6] | 0.6 | 9.1 | No. |
| Resyn 12K51 [7] | None | 7.9 | Yes. |
| Resyn 12K51 [7] | 0.6 | 5.4 | No. |
| Neoprene 735 [8] | None | 7.3 | Yes. |
| Neoprene 735 [8] | 0.6 | 8.7 | No. |

[1] 55% vinyl toluene—45% butadiene copolymer.
[2] Commercial acrylonitrile—butadiene copolymer.
[3] Commercial polyvinylacetate.
[4] 80% styrene—20% butadiene copolymer.
[5] Polystyrene.
[6] Commercial ethyl acrylate—methyl methacrylate copolymer.
[7] Commercial polyvinyl acetate copolymer.
[8] Commercial chloroprene polymer.

EXAMPLE 3

A synthetic GRS type latex of 55 percent vinyltoluene-45 percent butadiene prepared as previously described was modified by adding polyamine condensation products derived from different amine as well as products having different amineformaldehyde ratios. The modified compositions contained 0.6 percent by weight of polyamine condensation product per total weight of latex employed. These latex compositions as well as a control were streaked and incubated as described in Example 1 and then examined for microbial growth. The results are tabulated below.

*Table 3*

| Amine | Amine/HCHO Ratio (Mole) | pH | Microbial Growth |
|---|---|---|---|
| Control | None | 8.6 | Yes. |
| Triethylenetetramine | 1:2 | 9.7 | No. |
| Tetraethylenepentamine | 1:3.5 | 9.9 | No. |
| Diethylenetriamine | 1:1 | 10.7 | Yes. |
| Ethylenediamine | 1:2 | 9.7 | No. |
| Diethylenetriamine | 1:3.5 | 9.2 | No. |
| 3,3'-Iminobispropylamine | 1:2 | 11.1 | No. |

EXAMPLE 4

A water-emulsion paint employing a GRS type latex and having the formulation previously described was modified by adding varying concentrations of the condensation product of one mole of diethylenetriamine with 2.2 moles of formaldehyde. These paint samples as well as a control sample were inoculated and streaked as described in Example 1 and then observed for growth at the end of the incubation period. The results are given in Table 4.

*Table 4*

| Percentage [1] Condensation Product | pH | Microbial Growth |
|---|---|---|
| Control | 8.5 | Heavy. |
| 0.01 | 8.6 | Some. |
| 0.05 | 8.6 | Some. |
| 0.10 | 8.7 | Slight. |
| 0.30 | 8.8 | None. |
| 0.60 | 9.1 | None. |

[1] Concentration based on weight of solid product based on total weight of latex paint.

EXAMPLE 5

Duplicate samples of modified GRS type latex paint formulations were prepared by the addition of varying concentrations of the condensation product of 1 mole of diethylene-triamine with 2.2 moles of formaldehyde. In each pair, the pH of one sample was lowered by the addition of acetic acid and the pH of the other was increased by the addition of dilute sodium hydroxide solution. These paint samples as well as paint samples containing no polyamine condensation product and similarly adjusted with regard to pH were inoculated as described in Example 1. The inoculated samples were incubated 72 hours at 30° C. and then streaked on nutrient agar plates and the plates incubated for 3 days at 37° C. At the end of this period, observations were made for microbial growth. The data are given in the following table:

Table 5

| Percentage [1] Condensation Product | pH | Microbial Growth |
|---|---|---|
| Control | 8.5 | Heavy. |
| Control | 10.0 | Heavy. |
| 0.1 | 8.1 | Slight to none. |
| 0.1 | 10.0 | None. |
| 0.3 | 8.5 | None. |
| 0.3 | 10.0 | Very slight to none. |
| 0.5 | 8.5 | None. |
| 0.5 | 10.0 | None. |

[1] Concentration based on weight of solid polyamine product based on total weight of latex paint.

EXAMPLE 6

Products obtained by condensing (a) 1 mole of 3,3'-iminobispropylamine with 2.5 moles of formaldehyde and (b) 1 mole of diethylenetriamine with 2.0 moles of formaldehyde were added in varying concentrations to a commercial GRS 2000 type latex having a polymer composition of 46 percent styrene — 54 percent butadiene, a total solids content of 40 percent, a pH of 10–11 and a Mooney viscosity of 75. The treated latexes were allowed to stand 24 hours and then cast on clean glass plates as 20 mil wet films. When the films had dried they were stripped, and the free film tested for stability by determining the time elapse to initial failure when exposed to light from a carbon electrode arc lamp in a standard FadeOmeter. The results are given in the table below:

Table 6

| Polyamine Condensation Product | Percent Condensation Product Based on Latex Solids | Exposure Time to Initial Failure (Hours) |
|---|---|---|
| None | None | 24 |
| 1 mole 3,3'-iminobis-propylamine + 2.5 moles formaldehyde | 2.0 | 100 |
| Do | 2.5 | 124 |
| Do | 5.0 | 263 |
| 1 mole diethylenetriamine + 2.0 moles formaldehyde | 2.0 | 148 |
| Do | 2.5 | 172 |

EXAMPLE 7

Condensation products of (1) diethylenetriamine and (2) 3,3'-iminobispropylamine with formaldehyde were added to styrene-butadiene latexes of different monomer composition. Free films were prepared from latex as described in Example 6 and exposed in a FadeOmeter. At given intervals the films were checked for flexibility and discoloration. The results are given in the table:

Table 7

| Latex | Polyamine Condensation Product ||| Hours Exposed | Condition of Film |
|---|---|---|---|---|---|
| | Amine | HCHO Ratio [1] | Concentration (percent) [2] | | |
| A [3] | None | None | None | 25 | Almost brittle; slight yellowing. |
| A | Diethylene-triamine. | 2 | 2 | 25 | No change. |
| B [4] | None | None | None | 100 | Brittle; slight yellowing. |
| B | 3,3'-Imino-bispropyl-amine. | 2 | 2 | 100 | No change. |
| B | Diethylene-triamine. | 2 | 2 | 100 | Do. |
| B | do | 1.5 | 2 | 100 | Do. |
| B | do | 2.5 | 2 | 100 | Do. |

[1] Moles formaldehyde per mole amine.
[2] Percent by weight based on weight of solid condensation product per given weight of latex solids.
[3] Synthetic latex of a copolymer of 60% styrene—40% butadiene, 45 percent solids.
[4] Synthetic latex of a copolymer of 67% styrene—33% butadiene, 48% solids.

EXAMPLE 8

Free films were prepared from styrene-butadiene latexes of varying monomer composition as well as latexes modified by the addition of condensation products of (a) 3,3'-iminobispropylamine and (b) diethylenetriamine with formaldehyde, as described in Example 6. These films were placed in a metal frame and inserted in an oven at 100° C. to determine their stability to heat aging. The results are given in the following table:

Table 8

| Latex | Polyamine Condensation Product ||| Hours Exposed | Condition of Film |
|---|---|---|---|---|---|
| | Amine | HCHO Ratio [1] | Concentration (percent) [2] | | |
| A [3] | None | None | None | 100 | Almost brittle; slight yellowing. |
| A | Diethylene-triamine. | 2 | 2 | 100 | No change. |
| B [4] | None | None | 2 | 200 | Brittle; yellowing. |
| B | 3,3'-Imino-bispropyl-amine. | 2.5 | 2 | 200 | Slight stiffness. |
| B | Diethylene-triamine. | 2 | 2 | 200 | Do. |
| B | do | 2.5 | 2 | 200 | Slight stiffness, slight yellowing. |

[1] Moles formaldehyde per mole amine.
[2] Percent by weight based on weight of solid condensation product per given weight of latex solids.
[3] Synthetic latex of a copolymer of 60% styrene—40% butadiene, 45% solids.
[4] Synthetic latex of a copolymer of 67% styrene—33% butadiene, 48% solids.

EXAMPLE 9

A conventional latex paint having the formulation given below was prepared and used as a base paint, or control, for subsequent treatment.

| Composition: | Parts by Weight |
|---|---|
| Methocel HG, 4000 cps., 2.5% solution | 35.00 |
| Water | 52.50 |
| Tamol 731 (25% solution) [1] | 1.00 |
| Titanium dioxide | 75.00 |
| Magnesium silicate | 31.25 |
| Mica | 31.25 |
| Silica, diatomaceous | 12.50 |
| Phthalocyanine green | 5.00 |
| Black iron oxide | 0.75 |
| Synthetic latex [2] | 215.00 |

[1] "Tamol 731," sodium salt of formaldehyde condensation product of β-naphthalene sulfonic acid.
[2] A 60% styrene—40% butadiene latex, 45% solids.

The polyamine condensation product of 2.2 moles of formaldehyde with one mole of diethylenetriamine was added to two portions of this paint to give compositions containing 0.5 percent and 2 percent by weight (based on the total weight of paint). The treated paints and a control were used to coat six panels and the panels were exposed 203 hours in a "weatherometer." A "weatherometer" is a test cabinet containing a carbon electrode arc lamp as an ultraviolet light source around which the panels to be tested are rotated. During its rotation around the arc each panel passes a point every 18 minutes where it is sprayed with water for a duration of 1–1.5 minutes. The test cabinet is maintained at 145° F. and contains a pan of water to maintain high humidity. At the end of the exposure period, the following results were observed.

Table 9

| Panel | Control | | Polyamine Condensation Product | | | |
|---|---|---|---|---|---|---|
| | | | 0.5% | | 2.0% | |
| | Cracking | Blistering | Cracking | Blistering | Cracking | Blistering |
| 1 | Bad | Bad | None | Very slight | None | None. |
| 2 | do | do | do | do | Slight | Slight. |
| 3 | do | do | do | do | None | Very slight. |
| 4 | do | do | do | None | do | Do. |
| 5 | do | do | do | do | do | None. |
| 6 | do | do | do | do | do | Do. |

EXAMPLE 10

A latex paint having the composition described in Example 9 was prepared and used as control. A polyamine condensation product of 1 mole of diethylenetriamine and 2.2 moles of formaldehyde was added in an amount of 2.0 parts by weight based on the total weight of paint to a portion of the control paint composition. Previously cleaned steel panels were coated with the control paint compositions and with this same paint containing the polyamine condensation product. Rust spots appeared as soon as the film dried (approximately five minutes) in the panel painted with the control paint. No rust spots had appeared on the panel coated with the modified paint composition when it was examined two weeks after application of the coating.

We claim:

1. An aqueous colloidal dispersion comprising (1) a synthetic latex containing in the disperse phase a polymer obtained by polymerizing an olefinically unsaturated monomer containing in its structure at least one ethylenic group having the $CH_2=CH-$ linkage wherein said ethylenic group is joined to an atom selected from the group consisting of carbon and oxygen and (2) from about 0.25 to 5 percent by weight based on the weight of solids present in the synthetic latex of a water-soluble condensation product of from 1.5 to 3.5 molecular proportions of formaldehyde with one molecular proportion of an aliphatic polyamine having the general formula $$H_2N-(-C_nH_{2n}NH-)_x-H$$

wherein $n$ is an integer of from 2 to 3, inclusive, and $x$ is an integer of from 1 to 4, inclusive, wherein the condensation is carried out while maintaining the temperature of the reaction mixture below about 50° C.

2. An aqueous colloidal dispersion comprising (1) a synthetic latex containing in the disperse phase a copolymer of a conjugated aliphatic diolefin and vinyl aromatic hydrocarbon of the benzene series and (2) from about 0.25 to 5 percent by weight based on the weight of solids present in the synthetic latex of a water-soluble condensation product of from 1.5 to 3.5 molecular proportions of formaldehyde with one molecular proportion of an aliphatic polyamine having the general formula $$H_2N-(-C_nH_{2n}NH-)_x-H$$

wherein $n$ is an integer of from 2 to 3, inclusive, and $x$ is an integer of from 1 to 4, inclusive, wherein the condensation is carried out while maintaining the temperature of the reaction mixture below about 50° C.

3. An aqueous colloidal dispersion comprising (1) a synthetic latex containing in the disperse phase a copolymer of butadiene and a vinyl aromatic hydrocarbon of the benzene series and (2) from about 0.25 to 5 percent by weight based on the weight of solids present in the synthetic latex of a water-soluble condensation product of from 1.5 to 3.5 molecular proportions of formaldehyde with one molecular proportion of an aliphatic polyamine having the general formula $$H_2N-(-C_nH_{2n}NH-)_x-H$$

wherein $n$ is an integer of from 2 to 3, inclusive, and $x$ is an integer of from 1 to 4, inclusive, wherein the condensation is carried out while maintaining the temperature of the reaction mixture below about 50° C.

4. An aqueous colloidal dispersion comprising (1) a synthetic latex containing in the disperse phase a copolymer of from 25 to 75 percent by weight of butadiene and correspondingly from 75 to 25 percent by weight of a vinyl aromatic hydrocarbon of the benzene series and (2) from about 0.25 to 5 percent by weight based on the weight of solids present in the synthetic latex of a water-soluble condensation product of from 1.5 to 3.5 molecular proportions of formaldehyde with one molecular proportion of an aliphatic polyamine having the general formula $$H_2N-(-C_nH_{2n}NH-)_x-H$$

wherein $n$ is an integer of from 2 to 3, inclusive, and $x$ is an integer of from 1 to 4, inclusive, wherein the condensation is carried out while maintaining the temperature of the reaction mixture below about 50° C.

5. A water-dispersible synthetic latex comprising a polymer obtained by polymerizing an olefinically unsaturated monomer containing in its structure at least one ethylenic group having the $CH_2=CH-$ linkage wherein said ethylenic group is joined to an atom selected from the group consisting of carbon and oxygen and intimately blended therein from about 0.25 to 5 percent by weight based on the weight of solids present in the synthetic latex of a water-soluble condensation product of from 1.5 to 3.5 molecular proportions of formaldehyde with one molecular proportion of an aliphatic polyamine having the general formula $$H_2N-(-C_nH_{2n}NH-)_x-H$$

wherein $n$ is an integer of from 2 to 3, inclusive, and $x$ is an integer of from 1 to 4, inclusive, wherein the condensation is carried out while maintaining the temperature of the reaction mixture below about 50° C.

6. A water-dispersible synthetic latex comprising a polymer obtained by polymerizing an olefinically unsaturated monomer containing in its structure at least one ethylenic group having the $CH_2=CH-$ linkage wherein said ethylenic group is joined to an atom selected from the group consisting of carbon and oxygen and intimately blended therein from 0.75 to 3.0 percent by weight based on the weight of solids present in the synthetic latex of a water-soluble condensation product of from 1.5 to 3.5 molecular proportions of formaldehyde with one molecular proportion of an aliphatic polyamine having the general formula $$H_2N-(-C_nH_{2n}NH-)_x-H$$

wherein $n$ is an integer of from 2 to 3, inclusive, and $x$ is an integer of from 1 to 4, inclusive, wherein the condensation is carried out while maintaining the temperature of the reaction mixture below about 50° C.

7. A latex paint composition consisting of an aqueous colloidal dispersion comprising (1) a pigment, (2) a synthetic latex containing in the disperse phase a polymer obtained by polymerizing an olefinically unsaturated monomer containing in its structure at least one ethylenic group having the $CH_2=CH-$ linkage wherein said ethylenic group is joined to an atom selected from the group consisting of carbon and oxygen and (3) from about 0.06 to 3 percent by weight based on the total weight of paint employed of a water-soluble condensation product of from 1.5 to 3.5 molecular proportions of formaldehyde with one molecular proportion of an aliphatic polyamine having the general formula $$H_2N-(-C_nH_{2n}NH-)_x-H$$

wherein $n$ is an integer of from 2 to 3, inclusive, and $x$ is an integer of from 1 to 4, inclusive, wherein the condensation is carried out while maintaining the temperature of the reaction mixture below about 50° C.

8. A latex paint composition consisting of an aqueous colloidal dispersion comprising (1) a pigment, (2) a synthetic latex containing in the disperse phase a copolymer of from 25 percent to 75 percent by weight of butadiene and correspondingly from 75 percent to 25 percent by weight of a vinyl aromatic hydrocarbon of the benzene series and (3) from about 0.3 to 1.0 percent by weight based on the total weight of paint employed of a water-soluble condensation product of from 1.5 to 3.5 molecular proportions of formaldehyde with one molecular proportion of an aliphatic polyamine having the general formula $$H_2N-(-C_nH_{2n}NH-)_x-H$$

wherein $n$ is an integer of from 2 to 3, inclusive, and $x$ is an integer of from 1 to 4, inclusive, wherein the condensation is carried out while maintaining the temperature of the reaction mixture below about 50° C.

9. A method for imparting improved properties to aqueous colloidal dispersions comprising synthetic latexes, said synthetic latexes containing in the disperse phase a polymer obtained by polymerizing an olefinically unsaturated monomer containing in its structure at least one ethylenic group having the $CH_2=CH-$ linkage wherein said ethylenic group is joined to an atom selected from the group consisting of carbon and oxygen which includes the step of intimately blending therein a composition comprising from about 0.25 to 5 percent by weight based on the weight of solids present in the synthetic latex of a water-soluble condensation product of from 1.5 to 3.5 molecular proportions of formaldehyde with one molecular proportion of an aliphatic polyamine having the general formula $$H_2N-(-C_nH_{2n}NH-)_x-H$$

wherein $n$ is an integer of from 2 to 3, inclusive, and $x$ is an integer of from 1 to 4, inclusive, wherein the condensation is carried out while maintaining the temperature of the reaction mixture below about 50° C.

10. A method for imparting improved properties to latex paint compositions which comprises blending in the water-dispersible synthetic latex constituent of the paint, said synthetic latex constituent containing in the disperse phase a polymer obtained by polymerizing an olefinically unsaturated monomer containing in its structure at least one ethylenic group having the $CH_2=CH-$ linkage wherein said ethylenic group is joined to an atom selected from the group consisting of carbon and oxygen from about 0.06 to 3 percent by weight based on the total weight of the paint employed of a water-soluble condensation product of from 1.5 to 3.5 molecular proportions of formaldehyde with one molecular proportion of an aliphatic polyamine having the general formula $$H_2N-(-C_nH_{2n}NH-)_x-H$$

wherein $n$ is an integer of from 2 to 3, inclusive, and $x$ is an integer of from 1 to 4, inclusive, wherein the condensation is carried out while maintaining the reaction mixture below about 50° C.

References Cited in the file of this patent
UNITED STATES PATENTS 2,390,153    Kern _____ Dec. 4, 1945

FOREIGN PATENTS 456,572    Canada _____ May 10, 1949

OTHER REFERENCES

Fischer: "Organic Protective Coatings," Reinhold Publishing Co., New York, N. Y. (1953), pages 281, 294 and 300.

Dow Chemical Co. Bulletin "Dow Latex 512," October 1946, Midland, Mich.